United States Patent
Eriksson et al.

(10) Patent No.: US 8,205,573 B2
(45) Date of Patent: Jun. 26, 2012

(54) ROTARY PARLOUR FOR AUTOMATIC MILKING OF ANIMALS AND A METHOD FOR ATTACHING TEAT CUPS TO MILKING ANIMALS ON A ROTARY PLATFORM

(75) Inventors: Jan Eriksson, Uttran (SE); Gert Danneker, Grodinge (SE)

(73) Assignee: DeLaval Holding AB, Tumba (SE)

( * ) Notice: Subject to any disclaimer, the term of this patent is extended or adjusted under 35 U.S.C. 154(b) by 300 days.

(21) Appl. No.: 12/531,799

(22) PCT Filed: Mar. 13, 2008

(86) PCT No.: PCT/SE2008/050282
§ 371 (c)(1),
(2), (4) Date: Sep. 17, 2009

(87) PCT Pub. No.: WO2008/118068
PCT Pub. Date: Oct. 2, 2008

(65) Prior Publication Data
US 2010/0031889 A1    Feb. 11, 2010

(30) Foreign Application Priority Data
Mar. 23, 2007   (SE) ...................................... 0700731

(51) Int. Cl.
*A01J 3/00*     (2006.01)
*A01J 5/00*     (2006.01)
(52) U.S. Cl. .................................. 119/14.02; 119/14.03
(58) Field of Classification Search ............... 119/14.02, 119/14.03, 14.04, 14.08
See application file for complete search history.

(56) References Cited

U.S. PATENT DOCUMENTS

| | | | | |
|---|---|---|---|---|
| 3,765,373 A * | 10/1973 | Phillips | ...................... | 119/14.04 |
| 4,508,058 A | 4/1985 | Jakobson et al. | | |
| 5,865,138 A * | 2/1999 | van der Lely | .............. | 119/14.02 |
| 6,050,219 A | 4/2000 | Van Der Lely | | |
| 6,401,654 B1 * | 6/2002 | Hallsten et al. | ............ | 119/14.18 |
| 2002/0033138 A1 | 3/2002 | Brayer | | |
| 2007/0277737 A1 | 12/2007 | Maier et al. | | |
| 2008/0022933 A1 * | 1/2008 | Wase et al. | .................. | 119/14.08 |

FOREIGN PATENT DOCUMENTS

| | | |
|---|---|---|
| EP | 0 617 885 | 10/1994 |
| EP | 0 689 762 | 1/1996 |
| EP | 0 900 522 | 3/1999 |
| EP | 1 523 880 | 4/2005 |
| WO | 01/67852 | 9/2001 |
| WO | 02/23979 | 3/2002 |
| WO | 2005/094566 | 10/2005 |
| WO | 2005/122753 | 12/2005 |

OTHER PUBLICATIONS

International Search Report dated Jun. 17, 2008, from corresponding PCT application.

* cited by examiner

*Primary Examiner* — Monica Williams
(74) *Attorney, Agent, or Firm* — Young & Thompson

(57) ABSTRACT

A rotary parlour for milking of animals includes an annular rotary platform (20) adapted to form a support surface (18) for the animals (22), positioning elements (19, 23) for arranging the animals (1) in milking positions on the platform (20), a drive mechanism (30) adapted to supply a rotational motion to the platform (20), and teat cup storing devices (11) for holding parked teat cups (2, 2') in predetermined storing positions. The teat cup storing devices (11) are mounted in positions such that the teat cups (2, 2') are located vertically above the platform (20) in their storing positions.

22 Claims, 5 Drawing Sheets

ROTARY PARLOUR FOR AUTOMATIC MILKING OF ANIMALS AND A METHOD FOR ATTACHING TEAT CUPS TO MILKING ANIMALS ON A ROTARY PLATFORM

BACKGROUND OF THE INVENTION AND PRIOR ART

The present invention relates to a rotary parlour for milking of animals, wherein the parlour comprises an annular rotary platform adapted to form a support surface for the animals, a drive mechanism adapted to supply a rotational motion to the platform, and teat cup storing devices for holding parked teat cups in predetermined storing positions.

In a conventional rotary milking parlour, the cows walk on to an annular rotating platform and enter a milking stall. An operator fetches milking members with teat cups from storing devices and attaches the teat cups to the teats of the cows. The storing devices and the operator are arranged in the vicinity of each other on the outside or on the inside of the annular platform. Thereby, it is easy for the operator to fetch the teat cups in the storing devices. The platform may rotate continuously with a constant low speed. The milking processes of the cows has been finished when the cows has rotated nearly 360 degrees on the platform. The continuous flow of cows makes that rotary parlours have a high milking capacity. However, a condition for a well working milking parlour is the existence of the operator that manually attaches the teat cups to the cows.

EP 689 762 shows a rotary parlour for automatic milking of animals. A milking robot is here used for the attachment of the teat cups to a cow standing in a milking position on an annular platform. The milking robot is movably arranged on a rail track, which runs in an internal position of the annular platform along a part of its inner periphery. The teat cups are carried by a swingable arm construction such the teat cups are movably arranged between a storing position outside the annular platform and a teat cup attaching position under a milking animal. The milking robot performs the motion of the arm construction. However, the use of such a construction is restricted to tandem rotary parlours in which the cows stand in the driving direction of the platform. In order to achieve a closed positioning of the animals on the platform and an effective use of the platform surface, it is preferable if the animals stand in inclined positions in relation to the driving direction of the platform.

SUMMARY OF THE INVENTION

The object of the present invention is to provide a rotary parlour comprising storing devices for the teat cups which allow relatively simple motions for fetching and attaching the teat cups to the teats of an animal and a reliable retracting motion of the teat cups when a milking process has been finished.

This object is obtained, according to the invention, by the feature that the teat cup storing devices are mounted in positions such that the teat cups are located vertically above the platform in their storing positions. Thereby, it is possible to park the teat cups in storing positions relatively close to an animal standing on the platform in a milking position. Consequently, the milk conduits and the pulsation conduits, which are connected to the teat cups, can be made short. The risk that the conduits get entangled with each other is thus reduced. Further, the distance that the teat cups get in contact with the ground, during a retracting motion of the teat cups, can be minimised. This avoid that the teat cups will be dirty during the retracting process. Furthermore, the risk that the teat cups will damage the legs of the animals is even reduced.

According to a preferred embodiment of the invention, the teat cup storing devices are arranged in positions such that the teat cups, which are to be attached to an animal standing in a milking position, are located in storing positions on at least one side of said animal. Thereby, it is possible to move the teat cups from its storing positions to an attaching position through the relatively wide space between a front leg and a rear leg of the animal to be milked. Preferably, the teat cup storing devices are arranged in positions such that the teat cups, which are to be attached to an animal standing in a milking position, are located in a storing position in front of a rear leg and behind a front leg of said animal. Thereby, it is possible to move the teat cups from their storing positions to an attaching position by means of a straight-line motion. The teat cup storing devices may be arranged in positions such that the teat cups, which are to be attached to an animal standing in a milking position, are stored at a smaller distance form the rear leg than from the front leg of said animal. With such a positioning of the teat cup storing devices, the distance from the storing device to the udder of the animal standing in the milking position will be reduced to a minimum and very short milk conduit can be used. Alternatively, the teat cup storing devices may be arranged at a smaller distance form the front leg than from the rear leg of said animal. In this case, the risk that the animal steps on a milk conduit during the retracting process is substantially eliminated.

According to a further embodiment of the invention, the teat cup storing devices are arranged in positions such that an animal standing in a milking position has a teat cup storing devices on each side. A teat cup storing devices may here be arranged between all animals standing in a milking position on the platform. At least one teat cup from each of the storing devices arranged on different sides of the animal are adapted to be attached to said animal. If the milking animal is a cow, two teat cups from each of the storing devices are attached to the two nearest located teats of the cow. Thereby, the risk that the milking conduits and the pulsation conduits get entangled with each other during the retracting process is substantially eliminated.

According to a further embodiment of the invention, the rotary parlour comprises positioning means adapted to arrange the animals in milking positions on the platform such that a longitudinal axis of the animals forms an angle to the direction of motion of the animal on the platform. The positioning means may be fence arrangements dividing the platform into a plurality of milking stalls. The positioning means may also be feeding troughs or other kinds of components adapted to arrange the animals in predetermined milking positions on the platform. Consequently, the animals are standing in the milking positions with an inclination in relation the extension of the annular platform. Such an arrangement of the animal on the platform allows a relative close positioning of the animals on the platform. Said positioning means may be adapted to arrange the animals in milking positions such that the animals are standing in a radial direction on the annular platform with their heads at an outer periphery of the annular platform. Alternatively, said positioning means is adapted to arrange the animals in milking positions such that the animals are standing in a radial direction on the annular platform with their heads at an inner periphery of the annular platform. The animals are in these two embodiments arranged in a perpendicular direction in relation to the direction of motion of the animals on the platform. The animals may here be arranged very close together on the platform. According to a further alternative, said positioning means are adapted to arrange the animals in milking positions such that a longitudinal axis of the animals forms an angle of 20° to 80°, preferably 30° to 60°, to the direction of motion of the animal on the platform. The animals may here be arranged in a herringbone pattern on the platform. Also in this case, it is possible to arrange the animals very close together on the platform. The teat cup storing devices may here be arranged in positions such that the teat cups to be attached to an animal standing in a milking position are located in a storing position on one side of said animal and behind an animal standing in an adjacent milking position. When the animals are arranged in a herringbone pattern on a platform, the above-mentioned space is normally empty. Therefore, it is very suitable to use this space for mounting of the storing device housing the teat cups.

According to a further embodiment of the invention, the teat cup storing devices are adapted to hold the teat cups in storing positions such that an end surface comprising a recess for receiving a teat of an animal of the teat cups is located at a lower level than an opposite end surface of the teat cups. With such a positioning of the stored teat cups, possible remaining milk residues or cleaning liquid inside the recess will flow out. Alternatively, the teat cup storing devices are adapted to hold the teat cups in storing positions such that the end surface of the teat cups are located at the same level. In this case, the teat cups have a horizontal extension when they are parked in the storing device. Preferably, the teat cup storing devices comprise a retracting device for retracting the teat cups when a milking process has been finished. Such a retraction device may comprise a number of retracting cylinders which each retracts one teat cup from a teat by means of a pulling force acting on the milking conduit connected to said teat cup.

According to a further embodiment of the invention, the teat cup storing devices may comprise a cabinet like structure. The retracting cylinder may be mounted inside said cabinet like structure. Different areas of an outer surface of the cabinet like structure may be used to define the storing positions of the parked teat cups. The cabinet like structure may have a base portion mounted on an upper surface of the platform. Thereby, the cabinet like structure is mounted in a fixed position on the platform. Preferably, the gripping device and the storing device has a design such that the gripping device is able to grip at least two teat cups located in its storing positions at the same time. Thereby, a quick attachment process of the teat cups is obtained.

According to a further embodiment of the invention, the rotary parlour comprises a milking robot arm having an extension between an inner end portion and an outer end portion, wherein the outer end portion comprises a gripping device for gripping and attaching teat cups to the teats of an animal standing in a milking position. By the use of a milking robot, the need of an operator that manually attaches the teat cups to the cows is eliminated. The inner end portion of the milking robot arm may be arranged in a radially outside position of an outer periphery of the annular platform. The milking robot arm may be supported in a supporting element arranged outside the outer periphery of the platform. The outer end portion of the robot arm can here be moved above the platform to a gripping position, in which position it grips the teat cups in the storing devices. After that, the robot arm moves the gripped teat cups to an attaching position under an udder of a milking animal standing in a milking position. Alternatively, the inner end portion of the milking robot arm is arranged in a radially inside position of an inner periphery of the annular platform. The milking robot arm may here be supported in a supporting element arranged in the inner space of the platform. The inner end portion of the robot arm may be stationary supported. Alternatively, the inner end portion of the robot arm may be movably supported in a rail element. Thereby, it is possible to move the whole robot arm between different positions. Preferably, the robot arm is adapted to be movably arranged in a manner such that mutual motions between the inner end portion of the robot arm and the platform are eliminated. Thereby, the robot arm is able to be moved with the same velocity as an animal standing on the platform during an attaching process of the teat cups. In such a case, it is possible to use a robot arm having a relative simple construction.

BRIEF DESCRIPTION OF THE DRAWINGS

In the following, preferred embodiments of the invention are described by examples and with references to the attached drawings, in which.

BRIEF DESCRIPTION OF PREFERRED EMBODIMENTS OF THE INVENTION

Figure 1:
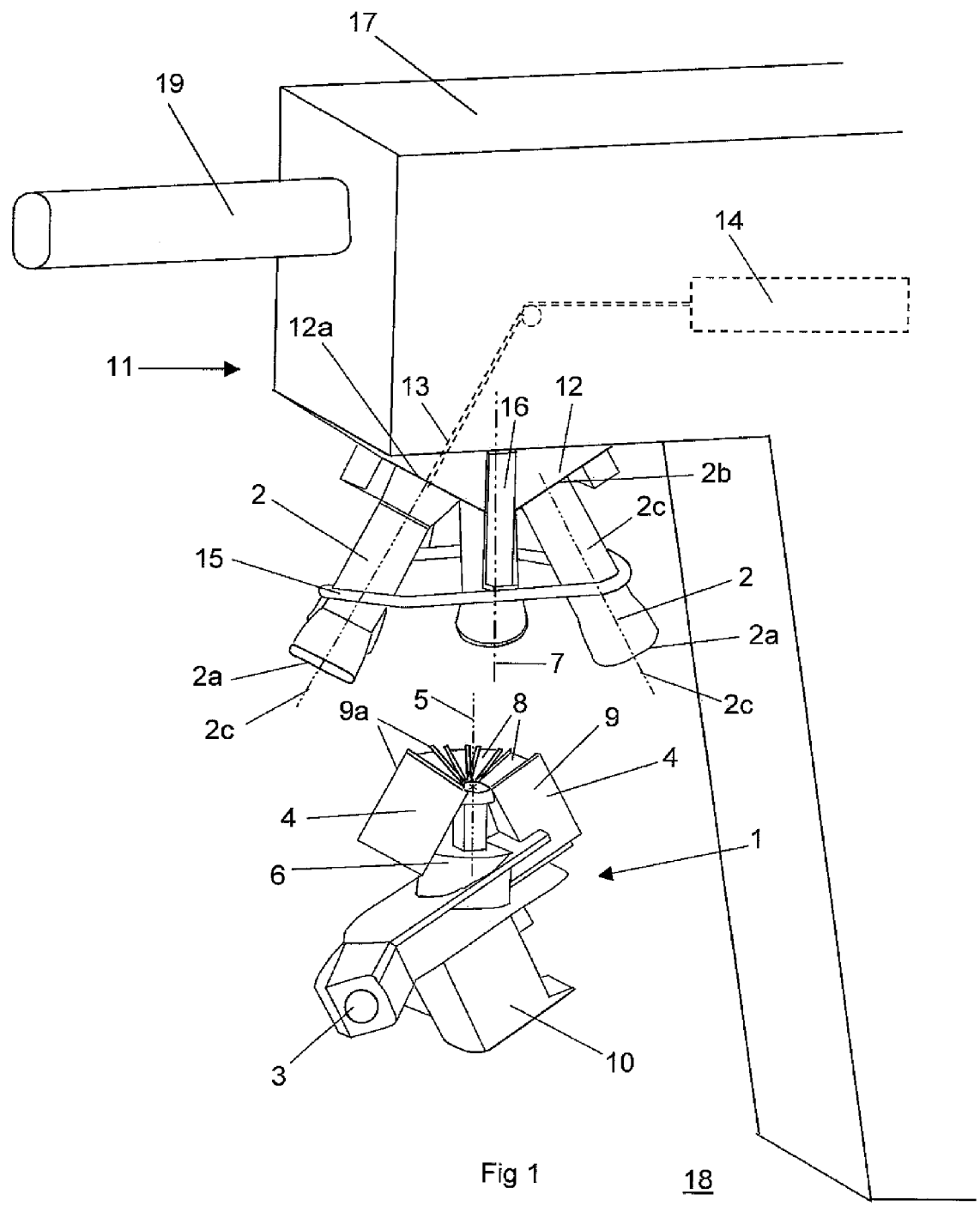
FIG. 1 shows a teat cup storing device and a gripping device of a milking robot.

FIG. 1 shows a gripping device 1 adapted to be connected to a robot arm of a milking robot which is adapted to automatically attach teat cups 2 to the teats of a milking animal. The milking animal may be a milking cow. The teat cups 2 have an elongated substantially cylindrical shape with a first end surface 2a provided with a recess for receiving a teat of a milking animal and an oppositely located second end surface 2b. Each teat cups 2 has a centrally located axis 2c extending centrally through the teat cup 2 and the end surfaces 2a, b. The gripping device 1 comprises connection means 3 for enabling a releasable connection between the gripping device 1 and a portion of the robot arm. The gripping device 1 comprises four substantially identically designed holding parts 4 arranged at different positions along a path extending around a first axis 5. The holding parts 4 are included in a unit 6 rotatably arranged around the first axis 5. The holding parts 4 are arranged at substantially the same distance from the first axis 5. Consequently, the holding parts are arranged along a part of a circular path around the first axis 5.

Each holding part 4 comprises an electromagnet 8 arranged between two side walls 9. At least a part of an outer surface of the teat cups 2 is made of a magnetic material. Thereby, it is possible to releasably grip a teat cup 2 in the respective holding parts 4 by means of the electromagnet 8. The side walls 9 are provided with front surfaces 9a adapted to come in contact with a surface of a teat cup 2 when it has been griped by the electromagnet 8. The front surfaces 9a of the respective grip portions 4 have a shape such that they are able to hold a gripped teat cup 2 in a predetermined position. The contact surfaces 9a of the different holding parts 4 are inclined in relation to each other. Thereby, it is possible to hold the teat cups 2 such that the longitudinal axes 2c of all teat cups 2 are inclined in relation to each other. Furthermore, the gripping device 1 comprises a camera 10 adapted to detect the position of the teats of a milking animal and the teat cups during attachment processes of teat cups 2 to the teats.

FIG. 1 shows four teat cups 2 located in storing positions in a storing device 11. The storing device 11 is included in a cabinet like structure 17. The storing device 11 comprises a plate member 12. The plate member 12 can be elastically suspended or be made of an elastic material. The plate member 12 is provided with four parking surfaces 12a which each has a specific inclination. Each parking surface 12a is adapted to receive a second end surface 2b of a teat cup 2. The parking surfaces 12a are directed downwards. Thereby, the first end surfaces 2a of the teat cups is located at a lower level than the second end surfaces 2b of the teat cups when the teat cups 2 are in the storing positions.

A milk conduit 13 and a not disclosed pulsation conduit are connected to the second end surface 2b of the respective teat cups 2. Each parking surface 12a is provided with a through hole for the milk conduit 13 and the pulsation conduit. The four parking surfaces 12a are arranged in different positions along a curved path around a second axis 7 having a vertical extension through a centre portion of the plate member 12. The parking surfaces 12a are located at substantially the same distance from the second axis 7, which extends through a center of curvature of the path. Consequently, the parking surfaces 12a are arranged along a substantially circular path around the vertical axis 7.

A schematically disclosed retraction device is arranged inside the cabinet like structure of the storing device 11. The retraction device is exemplified as retraction cylinders 14. One such retraction cylinder 14 is schematically shown in FIG. 1. Preferably, one retraction cylinder 14 for each teat cup 2 is used. The retraction cylinders 14 are adapted to provide a pulling force in the milk conduits 13, when a milking process has been finished. As a result, the teat cups 2 are removed from the teats of a milking animal and retracted to the storing device 11. Another object of the retraction devices 14 is to supply a pulling force on the milk conduits 13, when the teat cups 2 are in the storing position in the storing device 11. Thereby, the second end surfaces 2b of the teat cups 2 are pressed with a force against the respective parking surfaces 12a ensuring that the teat cups 2 obtains a desired inclination in the storing positions. The parking surfaces 12a have been inclined in relation to each other such that the longitudinal axes 2c of the teat cups 2 diverge in relation to each other in a direction from the second end surfaces 2b to the first end surfaces 2a of the teat cups. Thereby, a relatively large empty space is arisen between the lower first end surfaces 2a of the teat cups. An annular elastic element 15 is arranged around the teat cups 2 when they are in the storing positions. A lower end portion of two suspension members 16 is adapted to hold the annular elastic element 15 in a predetermined position around the teat cups 2. The upper end portions of the suspension members 16 are fixedly attached to the cabinet like structure 17.

When a milking process has to be performed, the milking robot moves the gripping device 1 to a position under the teat cups 2 which are arranged in storing positions in the storing device 11. The milking robot turns the gripping device 1 such that the holding parts 4 will be located at an upper position of the gripping device 1. Furthermore, the milking robot turns the gripping device 1 around the first axis 5 to a position in which the holding parts 4 are located substantially vertically under a respective teat cup 2 in the storing device 11. FIG. 1 shows the gripping device 1 in this position. The holding parts 4 are arranged at smaller distances from each other than the teat cups 2 in the storing device 11. Thereby, it is possible for the robot arm to lift the gripping device 1 substantially vertically upwards and into the space between the stored teat cups 2. The front surfaces 9a of the holding parts 4 have a somewhat larger inclination in relation to a horizontal plane than the inclination of the outer surfaces of the parked teat cups 2. Consequently, when the holding parts 4 come in contact with the respective teat cup 2, the front surfaces 9a of the holding parts 4 displaces the respective teat cups 2 a smaller distance outwardly against the resilient action of the elastic element 15 until the contact surfaces of the teat cups 2 exactly has the same inclination as the front surfaces 9a of the holding parts 4. In this state, the elastic element 15 presses the teat cups 2 against the electromagnets 8 of the holding parts 4 with a resilient force. The electromagnets 8 are activated and the teat cups 2 are simultaneously gripped by the respective holding parts 4. The robot arm moves the gripping device 1 vertically downwardly with the gripped teat cups 2. During this motion, the milk conduits 13 and pulsation conduits are pulled out from the cabinet like structure 17. The milking robot turns the gripping device 1 such that the holding parts 4 obtain a lower position of the gripping device 1 and the camera 10 an upper position of the gripping device 1. Thereafter, the milking robot moves the gripping device 1 to a teat cup attaching position under the udder of a milking animal. The cabinet like structure 17 is fixedly arranged on an upper surface of a rotary platform 18. A part of a fence arrangement 19 is connected to the cabinet like structure 17.

Figure 2:
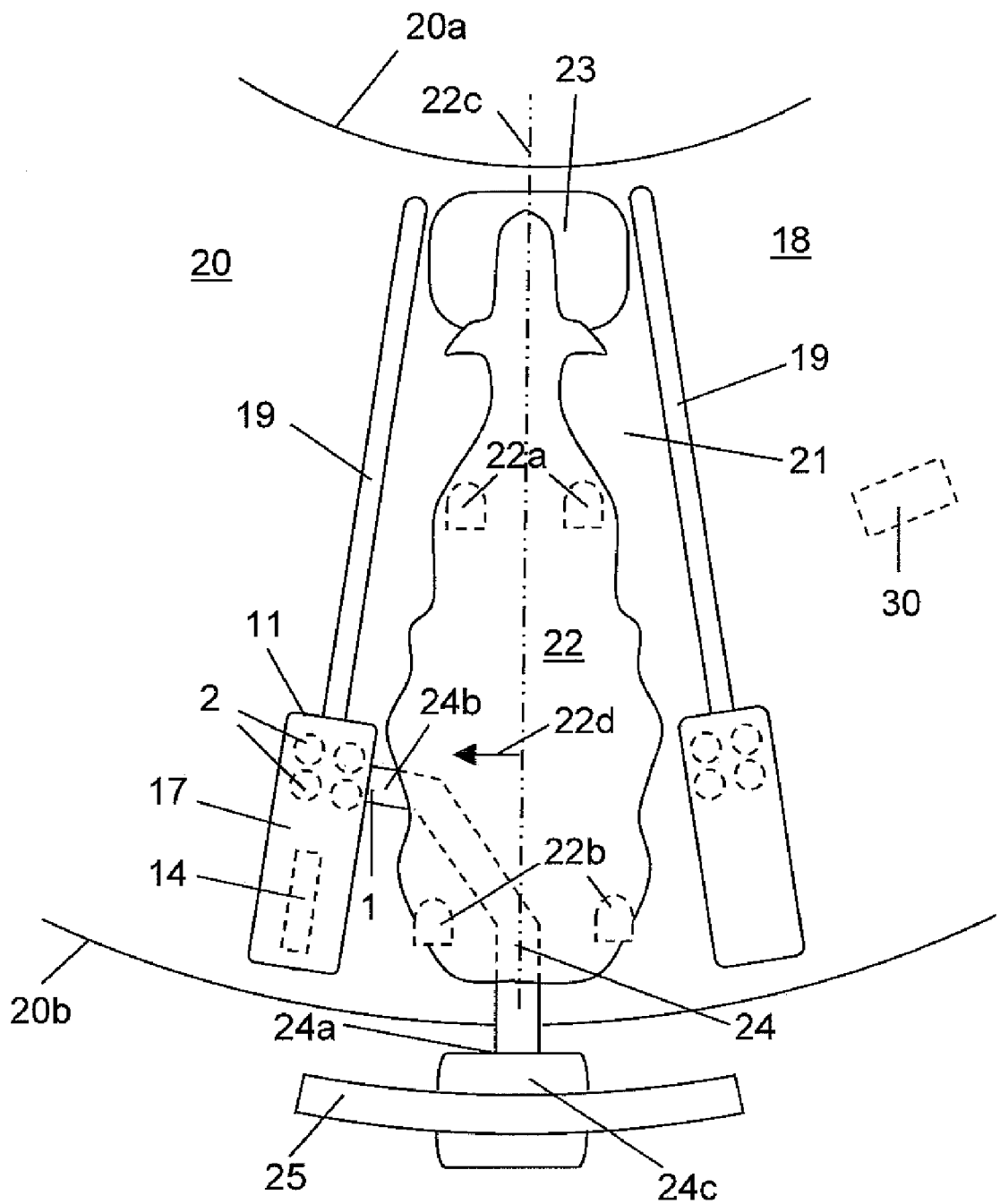
FIG. 2 shows a view from the above of a first arrangement of a teat cup storing device on a rotary platform.

FIG. 2 shows a part of an annular rotary platform 20. The platform 20 has an upper surface 18 provided with fence arrangements 19 having a substantially radial extension on the platform. The fence arrangements 19 divide the platform into a plurality of milking stalls 21. However, only one milking stall is shown in FIG. 2. A milking cow 22 is standing in a milking position in the milking stall 21. The positions of the front legs 22a and the position of the rear legs 22b of the cow 22 are indicated. A longitudinal axis 22c of the cow 22 is also indicated and an arrow 22d indicates the motion of direction of the cow 22 due to the rotary motion of the platform 20. The cow is standing in a radial direction on the annular platform 20 with her head at an inner periphery 20a of the platform. A feeding trough 23 is arranged in the milking stall 21. A schematically disclosed drive wheel 30 of a drive mechanism is arranged on the underside of the platform 20 for supplying a driving motion of the rotary platform 20.

A cabinet like structure 17 is arranged on each side of the cow 22. The cabinet like structures 17 comprises a storing device 11 for the teat cups 2. The teat cups 2 are located vertically above the upper surface 18 of the platform 20 in the storing positions. The teat cups 2 are located in storing positions radially inside a rear leg 22b and radially outside a front leg 22a of the cow 22 when it stands in a milking position on the annular platform 20. The parked teat cups 2 are located at a smaller distance form the rear leg 22b then from the front leg 22a of the cow 22. Consequently, the teat cups 2 are parked in storing positions located relatively close to the teats of the cow 22. A milking robot arm 24 is movably suspended in a curved rail element 25. The robot arm 24 is, at an inner end portion 24a, connected to the rail element 25 by means of a suitable connection member 24c. The rail element 24 has a curved extension in the outside of the outer periphery 20b of the annular platform 20. The robot arm 24 has an extension from the inner end portion 24a to an outer end portion 24b which comprises the gripping device 1.

When teat cups 2 are going to be attached to the teats of a cow 22, the robot arm 24 is activated. The entire robot arm is located outside the platform 20 in a non-activated state. The robot arm 24 moves the gripping device 1 through the space between the rear legs 22b of the cow 22. Thereafter, the robot arm 24 provides a turning motion such that the gripping device 1 reaches the teat cups 2 in the storing device 11 at the side of the cow 22. The gripping device 1 grips all teat cups 2 in the storing device 11 simultaneously and moves them to a teat attaching position under the udder of the cow 22. The robot arm 24 attaches the teat cups 2 in proper order to the teats of the cow 22. During this gripping and attaching process of the teat cups 2, the whole robot arm 24 can be moved along the curved rail element 25 with the same velocity as the platform 20. Thereby, it is possible to avoid mutual motions between the inner end portion 24a of the robot arm and the cow 22 standing in a milking position. When all teat cups have been attached to the teats of the cow 22, the entire robot arm 24 is retracted to a position outside the platform 20. As soon as the milking process of the cow 22 has been finished, the retraction cylinders 14 inside the cabinet like structure 17 is activated. The retraction cylinder 14 provide a pulling force in the respective milk conduits 13 of the teat cups 2 such that they are removed from the teats of the cow 22 and pulled back to its storing positions.

Figure 3:
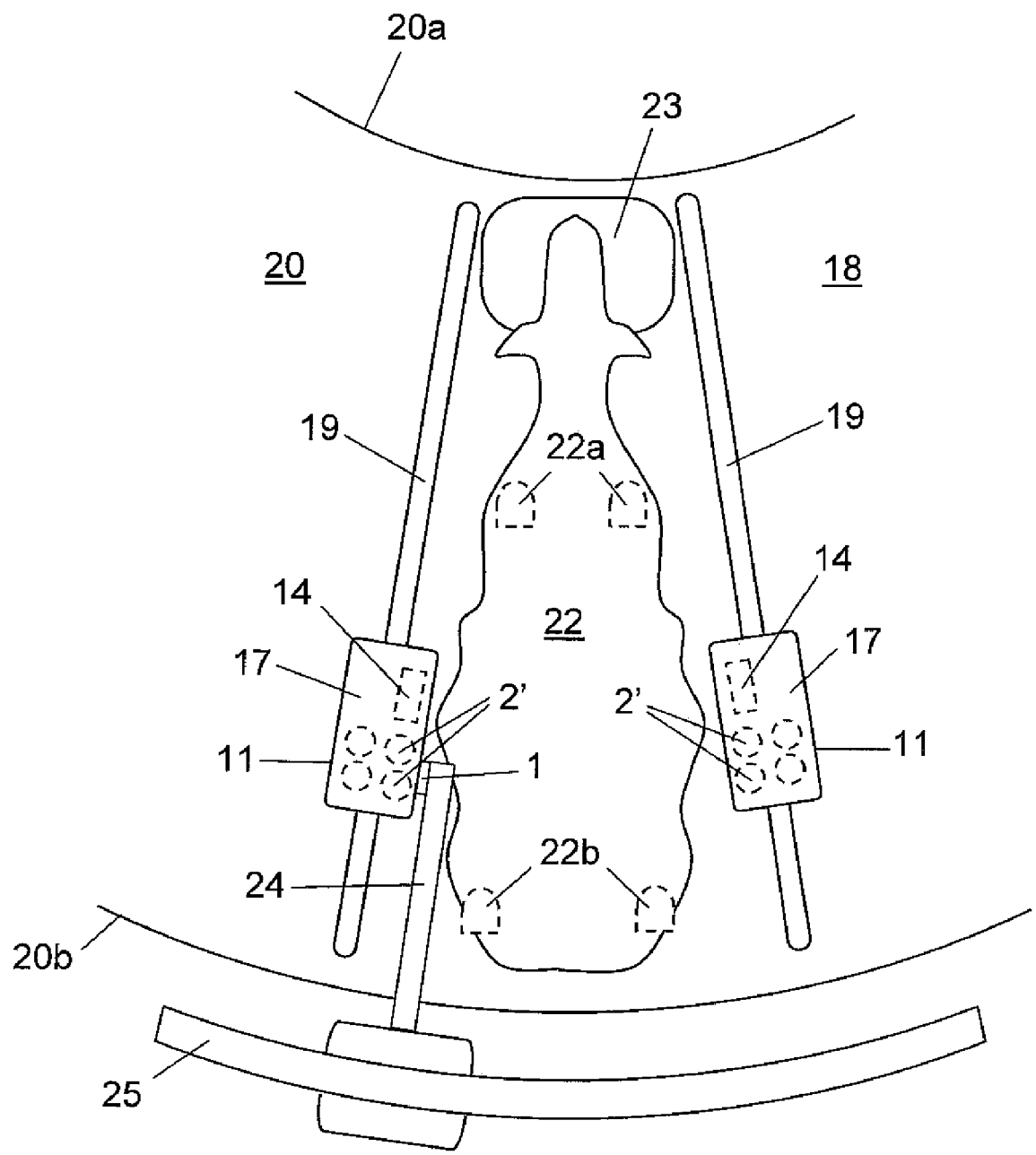
FIG. 3 shows a view from the above of a second arrangement of a teat cup storing device on a rotary platform.

FIG. 3 shows an embodiment comprising corresponding components as in the embodiment shown in FIG. 2. However, the function of this embodiment differs from the embodiment in FIG. 2. When teat cups 2 have to be attached to the teats of the cow 22, the robot arm 24 is activated. The robot arm 24 moves the grip device 1 into the space between one of the fence arrangements 19 and the cow 22. In this case, the robot arm 24 moves the grip device 1 into the space between the left fence arrangement 19 and the cow 22. The robot arm 24 provides a turning motion such that the gripping device 1 reaches the teat cups in the storing device 11. The gripping device 1 grips the two nearest located teat cups 2' simultaneously and moves them to a teat attaching position under the teats of the cow 22. The robot arm 24 attaches the two teat cups 2' in proper order to the left teats of the cow 22.

After that, the robot arm 24 is moved along the rail element 25 to a new position on the right side of the cow 2. Alternatively, the milking arm 24 is waiting in its initial position until the rotary platform 20 has been turned a distance such that the robot arm 24 obtains a position located on the right side of the cow 2. When the robot arm 24 is in this position, it moves the grip device 1 into the space between the right fence arrangements 19 and the cow 22. The robot arm 24 provides a turning motion such that the gripping device 1 reaches the teat cups in the right storing device 11. The gripping device 1 grips the two nearest located teat cups 2' simultaneously and moves them to a teat attaching position under the teats of the cow 22. The robot arm 24 attaches the two teat cups 2' in proper order to the right teats of the cow 22. When all teat cups 2' have been attached to the teats of the cow 22, the entire robot arm 24 is retracted to a position outside the platform 20.

As soon as the milking process of the cow 22 has been finished, the retraction cylinders 14 inside the respective cabinet like structures 17 are activated. The retraction cylinder 14 provide a pulling force in the respective milk conduits 13 of the teat cups 2' such that they are removed from the teats of the cow 22 and pulled back to its storing positions. Since the teat cups 2' attached to the left teats of the cow 22 are retracted in the left direction to the left storing device 11 and the teat cups 2' attached to the right teats of the cow 22 are retracted in the right direction to the right storing device 11, the risk that the milking conduits 13 of the teat cups 2' are entangled with each other is substantially completely eliminated.

Figure 4:
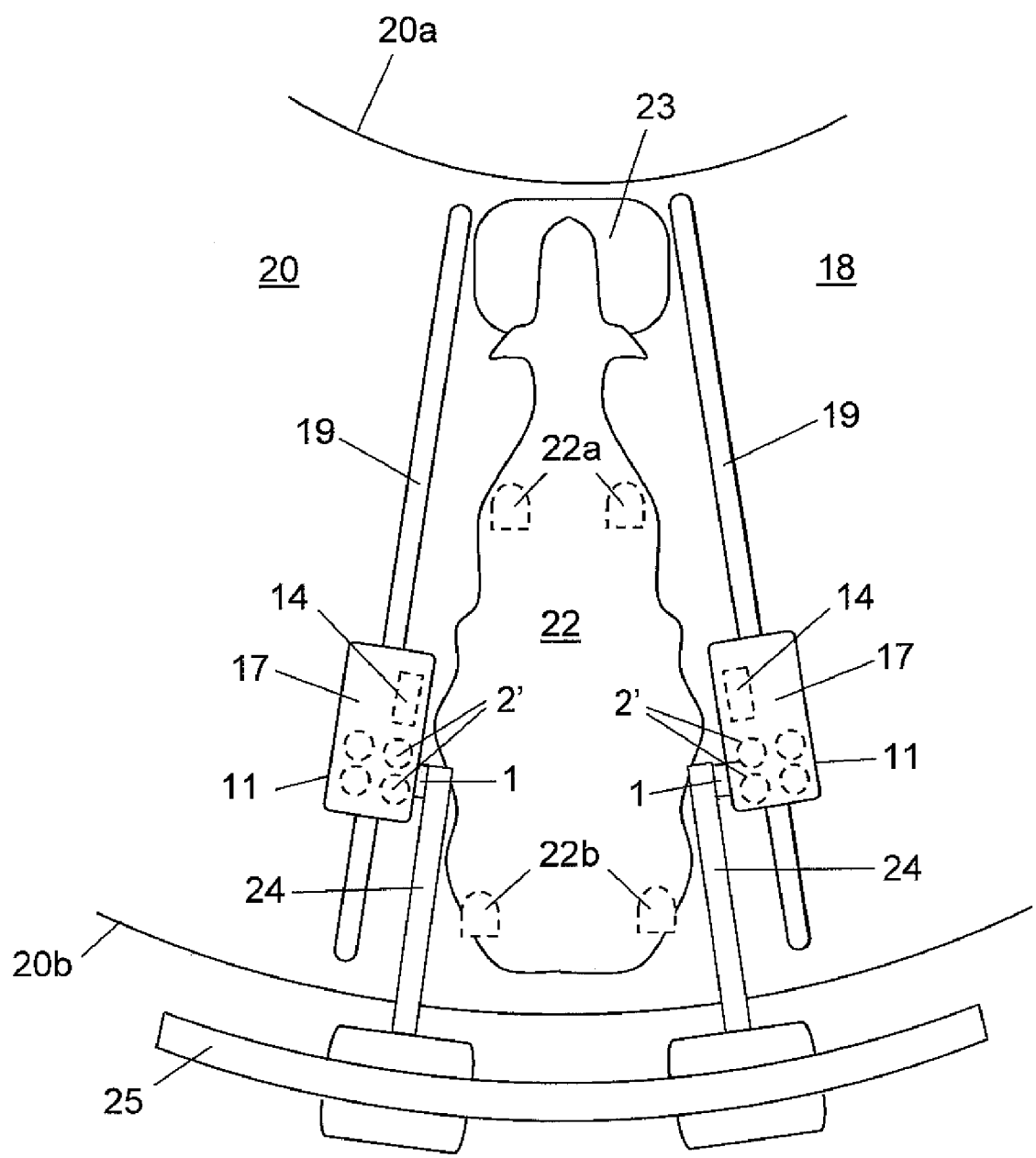
FIG. 4 shows a view from the above of a third arrangement of a teat cup storing device on a rotary platform and FIG. 5 shows a view from the above of a fourth arrangement of a teat cup storing device on a rotary platform.

FIG. 4 shows a variant of the embodiment shown in FIG. 3. In this case, two robot arms 24 are used. A left robot arm 24 grips two teat cups 2' in the left storing device 11 and attaches them to the left teats of the cow 22 in the milking stall 21. At the same time a right robot arm 24 grips two teat cups 2' in the right storing device 11 and attaches them to the right teats of the cow 22. When all teat cups 2' have been attached to the teats of the cow 22, the entire robot arms 24 is retracted to positions outside the platform 20. The retracting process of the teat cups 2' proceeds in the same manner as described above.

Figure 5:
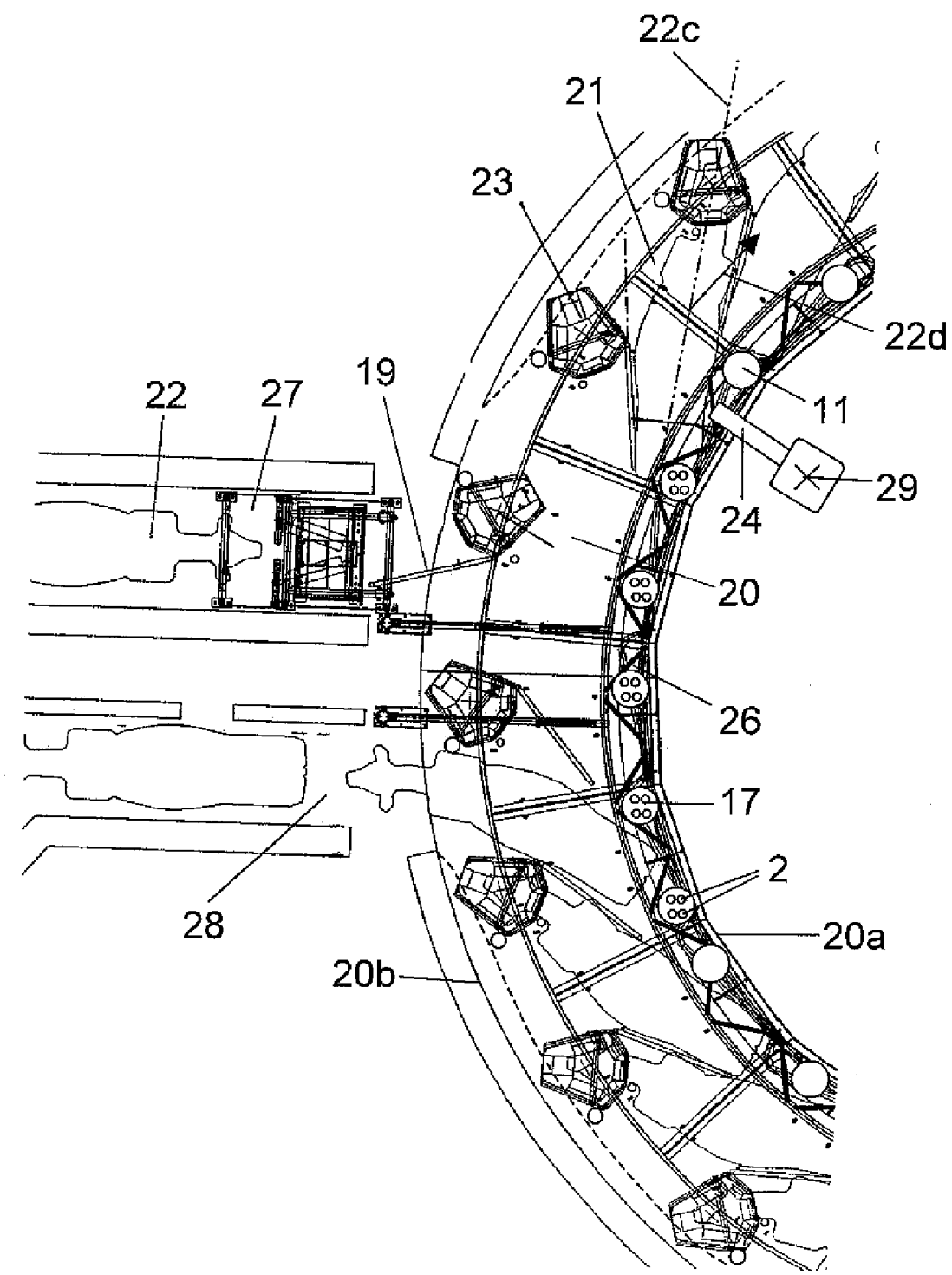

FIG. 5. shows a part of a rotary parlour for automatic milking of cows 22. Turntable fence members 19 are here used for dividing the platform 20 into stalls for receiving individual cows 22 in predetermined milking positions. By the use of turnable fence members 19, it is possible to position the cows 22 very close together on the platform 20. Each of the fence members 19 is fixedly connected to a feeding trough 23. The feeding troughs 23 attract the cows 22 and facilitate the positioning of the cows in the milking positions. A rumprail 26 is arranged at the inner periphery of the platform 20. The rumprail 26 prevents the cows 22 from accidentally falling or stepping out of the platform 20. The cows 22 are arranged on the platform 22 such that the longitudinal axis 22c of the respective cows forms an angle to the direction of motion 22d of the cows on the platform 20. The cows 22 are here arranged in a herringbone pattern on the platform 20. The head of the cows 22 are in an outer radial position of the platform 20. Thus, the cows 1 face outwards. An entry 27 and an exit 28 for the cows 22 are located adjacent to each other at an outer periphery 20b of the platform 20.

A milking robot arm 24 is here suspended in a stationary support element 29 arranged in a position inside the inner periphery 20a of the platform 20. A cabinet like structure 17 comprising a storing device 11 for storing the teat cups in predetermined storing position are arranged on the platform 20. In this case, the teat cups, which are to be attached to an cow 22 standing in a milking position, are located in storing positions on one side of said cow 22 and behind an cow 22 standing in an adjacent milking position. When the cows 22 are arranged in a herringbone pattern on a platform 20, the above-mentioned space is normally empty. Therefore, it is very suitable to use this space for storing of the teat cups. Furthermore, the storing devices 11 are protected in this position by the rump rails 26.

When a cow has entered the platform 20, via the entry 27, and is standing in a milking position, the robot arm 24 is activated. The robot arm 24 moves the grip device 1 such that it reaches the teat cups 2 parked in the storing devices 11 arranged behind a rump rail 26 of a prevailing cow, which already has been provided with teat cups 2. The gripping device 1 grips all teat cups 2 simultaneously. This storing devices 11 is located in front of the teats of the cow 2. Thereby, the rotary motion of the platform 20 helps to move the gripped teat cups 2 to a teat attaching position. The robot arm 24 attaches the teat cups 2 in proper order to the teats of the cow 22. When all the teat cups have been attached to the teats of the cow 22, the entire robot arm 24 is retracted to a position outside the platform 20. As soon as the milking process of the cow 22 has been finished, the retraction cylinders 14 inside the cabinet like structure 17 is activated. The retraction cylinder 14 provide a pulling force in the respective milk conduits 13 of the teat cups 2 such that they are removed from the teats of the cow 22 and pulled back to its storing positions in the cabinet like structures 17. Thereafter, the cow leaves the platform 20 via the exit 28.

The invention is not limited to the described embodiments but may be varied and modified freely within the scope of the claims. For example, other kinds of the gripping devices 1 and the storing devices 11 than the described in FIG. 1 can be used. The gripping device and the storing device can be designed such that the gripping device fetches and attaches one teat cup at a time from the storing device.

The invention claimed is:

1. A rotary parlour for milking of animals, comprising:
an annular rotary platform (20) adapted to form a support surface (18) for the animals (22);
a drive mechanism (30) adapted to supply a rotational motion to the platform (20);
teat cup storing devices (11) for holding parked teat cups (2, 2') in predetermined storing positions, each teat cup storing device (11) mounted such that, in their storing positions, all the teat cups (2, 2') are located vertically above the platform (20) and outside an area occupied by an animal in a milking position on the platform; and
a milking robot arm (24) movable between the teat cup storing device and teats of the animal in a milking position on the platform, the milking robot arm comprising a gripping device (1) for gripping the teat cups in their storing positions, wherein the storing positions are always outside the area occupied by the animal when in the milking position of the platform, moving the teat cups to the teats of the animal, and attaching the teat cups (2, 2') to the teats of an animal (22),
wherein the teat cup storing devices (11) are arranged in storing positions such that the teat cups (2, 2'), which are to be attached to an animal standing in a milking position, are located in a storing position in front of a rear leg (22b) and behind a front leg (22a) of said animal (22), and
wherein the teat cup storing devices (11) are arranged in positions such that an animal (22) standing in a milking position has teat cup storing devices (11) on each side, each teat cup storing device servicing two adjacent milking positions.

2. A rotary parlour according to claim 1, wherein the teat cup storing devices (11) are mounted in positions such that the stored teat cups (2, 2') are located at a radial distance from an inner periphery (20a) of the annular platform and at a radial distance from an outer periphery (20b) of the annular platform.

3. A rotary parlour according to claim 1, wherein the teat cup storing devices (11) are arranged in positions such that the teat cups (2, 2'), which are to be attached to an animal standing in a milking position, are located at a smaller distance from the rear leg (22b) than from the front leg (22a) of said animal (22).

4. A rotary parlour according to claim 1, wherein at least one teat cup (2') from each of the storing devices (11) arranged on the different sides of the animal (22) are adapted to be attached to said animal (22).

5. A rotary parlour according to claim 1, wherein the rotary parlour comprises positioning means (19, 23) adapted to arrange the animals in milking positions on the platform (20) such that a longitudinal axis (22c) of the animals forms an angle to the direction of motion of the animal (22d) on the platform (20).

6. A rotary parlour according to claim 5, wherein said positioning means are adapted to arrange the animals (22) in milking positions such that the animals (22) are standing in a radial direction on the annular platform (20) with their heads at an outer periphery (20b) of the annular platform during milking.

7. A rotary parlour according to claim 5, wherein,
said positioning means is adapted to arrange the animals (22) in milking positions such that the animals (22) are standing in a radial direction on the annular platform (20) with their heads at an inner periphery (20a) of the annular platform during milking.

8. A rotary parlour according to claim 5, wherein said positioning means (19) are adapted to arrange the animals in milking positions such that a longitudinal axis (22c) of the animals forms an angle of 20° to 80° to the direction of motion of the animal (22d) on the platform (20).

9. A rotary parlour according to claim 1, wherein the teat cup storing devices (11) comprise a retracting device (14) for retracting the teat cups (2, 2') when a milking process has been finished.

10. A rotary parlour according to claim 1, wherein each teat cup storing device (11) is included in a cabinet like structure (17), and wherein cabinet like structure (17) has a base portion mounted on the upper surface (18) of the platform.

11. A rotary parlour according to claim 1, wherein the milking robot arm (24) has an extension between an inner end portion (24a) and an outer end portion (24b), and wherein the outer end portion (24b) comprises the gripping device (1) for gripping and attaching teat cups (2, 2') to the teats of the animal (22) standing in a milking position.

12. A rotary parlour according to claim 11, wherein the inner end portion (24a) of the milking robot arm is arranged in a position radially outside of an outer periphery 20b of the annular platform (20) during attachment of the teat cups to an animal to be milked.

13. A rotary parlour according to claim 11, wherein the inner end portion (24a) of the milking robot arm is arranged in a position radially inside of an inner periphery (20a) of the annular platform (20) during attachment of the teat cups to an animal to be milked.

14. A rotary parlour according to claim 12, wherein the inner end portion (24a) of the milking robot arm is stationary supported.

15. A rotary parlour according to claim 12, wherein the inner end portion (24a) of the milking robot arm is movably supported in a rail element (25).

16. A rotary parlour according to claim 15, wherein the robot arm (24) is adapted to be movably arranged in the rail element (25) in a manner such that mutual motions between the inner end portion (24a) of the robot arm and the moving platform (20) are eliminated.

17. A rotary parlour according to claim 1, wherein the gripping device (1) and the storing device (11) have a design such that the gripping device (1) is able to grip at least two teat cups (2, 2') located in its storing positions at the same time.

18. A method for attaching teat cups to milking animals standing on a rotary parlour, wherein the parlour comprises an annular rotary platform (20) adapted to form a support surface (18) for the animals (22), positioning means (19, 23) for arranging the animals (1) in milking positions on the platform (20), a drive mechanism (30) adapted to supply a rotational motion to the platform (20), and teat cup storing devices (11) for holding parked teat cups (2, 2') in predetermined storing positions vertically above the platform (20) and outside an area occupied by an animal in a milking position on the platform, each teat cup storing device (11) mounted in between two milking positions at the sides of two adjacent animals such that the stored teat cups (2, 2') between an inner periphery (20a) of the annular platform and an outer periphery (20b) of the annular platform such that one teat cup storing device is positioned on each side of the animal, the teat cup storing devices (11) arranged in storing positions such that the teat cups (2, 2'), which are to be attached to an animal standing in a milking position, are located in a storing position in front of a rear leg (22b) and behind a front leg (22a) of said animal (22), and a milking robot arm (24) having an extension between an inner end portion (24a) and an outer end portion (24b), wherein the inner end portion (24a) is located at the side of the platform (20) and the outer end portion (24b) comprises a gripping device (1) for gripping and attaching teat cups (2, 2') to the teats of an animal (22) standing in a milking position, the method comprising the steps of:

moving the gripping device (1) of the robot arm to a gripping position above the platform (20) and below the storing position of the teat cups, in which gripping position the gripper grips at least one teat cup, located at the storing position, in the storing device; and moving the gripped teat cup (2, 2') to an attaching position under the udder of an animal (22) standing in the milking position, in which attaching position the gripper attaches the teat cup (2, 2') to a teat of the animal (22).

19. A rotary parlour for milking of animals, comprising:

an annular rotary platform (20) adapted to form a support surface (18) for the animals (22), the platform divided into plural milking stalls (21), each milking stall defining a milking position;

a drive mechanism (30) adapted to supply a rotational motion to the platform (20);

a teat cup storing device (11) for holding parked teat cups (2, 2') in predetermined, stationary storing position, the teat cup storing device (11) mounted in a position at one side of an animal in a milking position, and such that, in their storing positions, all the teat cups (2, 2') are located vertically above the platform (20) and outside an area occupied by the animal in a milking position on the platform;

a milking robot arm (24) movable between the teat cup storing device and teats of the animal in a milking position on the platform, the milking robot arm comprising a gripping device (1) for gripping the teat cups in their storing positions, wherein the storing positions are always outside the area occupied by the animal when in the milking position of the platform, moving the teat cups to the teats of the animal, and attaching the teat cups (2, 2') to the teats of an animal (22), wherein the teat cup storing devices (11) are arranged in storing positions such that the teat cups (2, 2'), which are to be attached to an animal standing in a milking position, are located in a storing position in front of a rear leg (22b) and behind a front leg (22a) of said animal (22), and wherein two teat cups of the teat cup storing device service the animal in the milking position, and another two teat cups of the teat cup storing device service the another animal in the adjacent milking position.

20. The rotary parlour of claim 19, further comprising:

a support element (25) mounted radially outside the platform (20), the milking robot arm (24) being mounted to the support element (25), and wherein the teat cup storing device (11) is mounted in the position at the one side of the animal in the milking position and at one side of another animal standing in an adjacent milking position, such that the teat cup storing device (11) is located between the sides of two adjacent milking positions, , and wherein the teat cup storing positions are located at a smaller distance from rear legs (22b) of the animals than a distance from front legs (22a) of the animals (22).

21. The rotary parlour of claim 20, further comprising:

a further one of said teat cup storing device (11), wherein the further teat cup storing device (11) is mounted in a position at the another side of the animal in the milking position and at one side of still another animal standing in a still another adjacent milking position, such that the further teat cup storing device (11) is located between the sides milking position and the adjacent still another milking position, wherein two teat cups of the teat cup storing device service the animal in the milking position, and two teat cups of the further teat cup storing device service the animal in the adjacent milking position, wherein the milking robot arm is adapted to first move the two teat cups of the teat cup storing device to two teats of the animal and then to second move the two teat cups of the further teat cup storing device to two other teats of the animal in the milking position.

22. The rotary parlour of claim 20, further comprising:

a further one of said teat cup storing device (11); and a further one of said milking robot arm mounted to the support element (25), wherein the further teat cup storing device (11) is mounted in a position at the another side of the animal in the milking position and at one side of still another animal standing in a still another adjacent milking position, such that the further teat cup storing device (11) is located between the sides milking position and the adjacent still another milking position, wherein two teat cups of the teat cup storing device service the animal in the milking position, and two teat cups of the further teat cup storing device service the animal in the adjacent milking position, wherein the milking robot arm is adapted to first move the two teat cups of the teat cup storing device to two teats of the animal, and wherein the another robot arm is adapted to move the two teat cups of the further teat cup storing device to two other teats of the animal in the milking position.

\* \* \* \* \*